United States Patent
Chikamori

[11] 4,113,587
[45] Sep. 12, 1978

[54] METHOD FOR ELECTROCHEMICAL MACHINING

[75] Inventor: Kunio Chikamori, Tokyo, Japan

[73] Assignee: Agency of Industrial Science and Technology, Tokyo, Japan

[21] Appl. No.: 833,862

[22] Filed: Sep. 12, 1977

Related U.S. Application Data

[63] Continuation of Ser. No. 602,135, Aug. 5, 1975, abandoned.

[30] Foreign Application Priority Data

Aug. 5, 1974 [JP] Japan .................................. 49-89723

[51] Int. Cl.² .............................................. B23P 1/00
[52] U.S. Cl. ........................... 204/129.1; 204/DIG. 8
[58] Field of Search ...................... 204/129.43, 129.25, 204/DIG. 8, 129.1, 228

[56] References Cited

U.S. PATENT DOCUMENTS

| | | | |
|---|---|---|---|
| 3,294,666 | 12/1966 | Wiersma | 204/129.43 |
| 3,297,555 | 1/1967 | Rerat | 204/129.43 |
| 3,417,006 | 12/1968 | Inoue | 204/129.43 |
| 3,477,929 | 11/1969 | Namikata et al. | 204/129.43 |
| 3,520,788 | 7/1970 | Paehr | 204/129.43 |
| 3,607,689 | 9/1971 | Inoue | 204/129.43 |
| 3,649,488 | 3/1972 | Pitetti et al. | 204/129.43 |
| 3,654,116 | 4/1972 | Inoue | 204/DIG. 8 X |
| 3,883,793 | 5/1975 | Mizuhara et al. | 204/129.25 X |

Primary Examiner—John H. Mack
Assistant Examiner—D. R. Valentine
Attorney, Agent, or Firm—Kurt Kelman

[57] ABSTRACT

In a method for electrochemical machining effected by disposing a work blank and a cathode opposite each other across a gap in an electrolyte and causing a flow of electric current to pass between said work blank and cathode, an improvement is disclosed which consists in using, as the electric current, a pulsating electric current having a pulse width of from 0.01 to 10 ms and a duty factor of not more than 0.5. Use of the pulsating electric current of the foregoing description in place of direct current enables the desired machining to be accomplished effectively on the work blank without involving any forced movement of the electrolyte.

5 Claims, 4 Drawing Figures

METHOD FOR ELECTROCHEMICAL MACHINING

This is a continuation of application Ser. No. 602,135, filed Aug. 5, 1975, now abandoned.

BACKGROUND OF THE INVENTION

The present invention relates to a method for electrochemical machining. More particularly, this invention relates to a method for enabling a work blank disposed opposite an electrode across a gap to be machined to desired shape and dimensions by causing the action of electrochemical dissolution to be concentrated upon or confined to the points of the work blank required to be removed.

By a mechanical method of machining, it is difficult to machine a material or work blank such as of heat-resisting alloy to a complicated shape without deformation. For this reason, the electrochemical method has come to find an increasingly popular acceptance in this sort of machining.

According to the conventional electrochemical machining method, a given work blank and a cathode are disposed very close to each other (across a gap of from 0.02 to 0.7 mm) in an electrolyte and a flow of direct current having a high current density of 30 to 300 A/cm$^2$ is passed between the work blank and the cathode. In this case, the equilibrium gap (the gap between the cathode and the work blank) must be decreased in order to increase the machining speed and enhance the machining accuracy. This inevitably requires the current density to be maintained at a sufficiently high level by constantly feeding the cathode toward the work blank as the machining work progresses. This is because a decrease in the current density lowers the metal removal effect (amount of metal removed/amount of electricity passed), making it no longer possible to continue the machining operation.

When the electrochemical machining is performed by using a direct current in an electrolyte kept at rest, the ions, gases, etc. which are formed by the electrochemical reaction involved stagnate between the two electrodes and consequently interfere with maintenance of high current density and also bring about a local buildup of heat in the electrolyte, preventing the machining operation from being continued smoothly. To avoid this trouble, therefore, it has been necessary for the electrolyte to be forcibly circulated at a high rate of not less than 10 m/sec. thoughout the entire period of machining operation. In order for the electrolyte to be kept in circulating motion at such a high rate of speed, however, there is required incorporation of a flow generating device. If, in this case, the electrodes are in the form of fine wires, the moving electrolyte produces a force which vibrates the electrodes and degrades the machining accuracy. It is further sometimes the case that the work blank has a shape such as to impede effective flow of the electrolyte, making it no longer possible to perform the desired machining on the work blank at all.

An object of the present invention is to provide a method for electrochemical machining which enables a given work blank to be machined highly efficiently without requiring the electrolyte to be forcibly circulated.

SUMMARY OF THE INVENTION

The method for electrochemical machining according to the present invention accomplishes the object described above by carrying out the electrochemical machining by use of a pulsating electric current having a pulse width of from 0.01 to 10 ms and a duty factor of not more than 0.5.

In the method of the present invention, the products of electrolysis or electrochemical dissolution occurring between the two electrodes are removed by virtue of diffusion. Moreover, the gases which are generated intermittently by the pulsating electric current are believed to act so as to cause agitation of the electrolyte and this agitation is thought to contribute considerably to the removal of the products of electrochemical dissolution. This is why the method of this invention provides effective electrochemical machining without requiring the electrolyte to be forcibly moved as is involved in the conventional method. Because of the preclusion of said forcible movement of the electrolyte, the electrodes including the work blank are not vibrated and the work can be machined with high accuracy. The method of this invention, therefore, proves particularly advantageous for the purpose of wire cutting in which a fine wire is used as an electrode.

The other objects and characteristic features of the present invention will become apparent from the description to be given herein below in further detail with reference to the accompanying drawing.

BRIEF EXPLANATON OF THE DRAWING

DETAILED DESCRIPTION OF THE INVENTION

Figure 1:
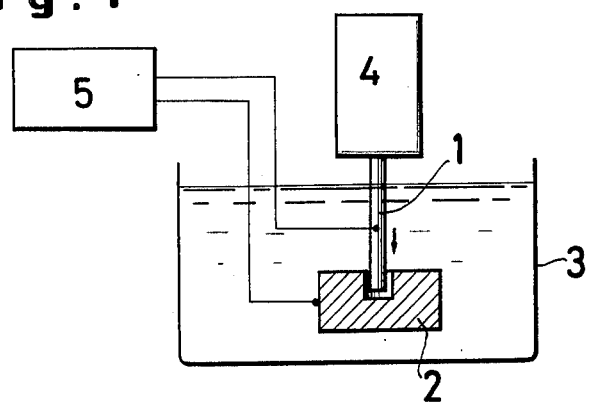
FIG. 1 is an explanatory diagram showing one preferred embodiment of the electrochemical machining according to the present invention.

FIG. 1 is an explanatory diagram illustrating one preferred embodiment of the method for electrochemical machining according to the present invention; a work blank 2 is immersed in an electrolytic reservoir 3 containing an electrolyte and a cathode 1 is disposed opposite the position at which the work blank is to be machined. Said cathode 1 is connected to a feed device 4 which serves to feed the cathode 1 at a fixed rate. The work blank 2 and the cathode 1 are respectively connected to a power source (pulse generator) 5.

In a system like the one described above, it has heretofore been customary to effect the electrochemical machining by supplying direct current from the power source to the cathode and the work blank, advancing the cathode in proportion as the work of machining progresses on the work blank and thereby keeping the equilibrium gap at a fixed value, and causing the electrolyte to be forcibly moved past the freshly machined part of the work blank.

It has been discovered that when a pulsating current is used in place of direct current, the electrochemical machining can effectively be obtained without said forcible movement of the electrolyte. The present invention has issued from this discovery.

Desirably the pulsating electric current to be used in the method for the electrochemical machining according to the present invention has a pulse width of from 0.01 ms to 10 ms and a duty factor of not more than 0.5. When the pulse width is less than 0.01 ms, virtually all the electric current is spent in charging and discharging of the electrical double layer, rendering the desired machining unattainable. When the pulse width exceeds the upper limit 10 ms, however, the phenomenon of concentration polarization becomes so conspicuous as to make it no longer possible to obtain a sufficiently high current density, with the result that the machining speed is lowered and the machining accuracy is degraded. When the duty factor of the pulse current exceeds the upper limit 0.5, the pulse density so closely approaches that of direct current that there similarly ensues the phenomenon of concentration polarization which renders the machining impracticable.

With the exception of the fact that pulsating electric current is used in place of direct current and the electrolyte is not required to be forcibly moved, the method for electrochemical machining according to this invention is similar to the conventional method for electrochemical machining: Thus, the working voltage is selected in the range of from 5 to 50 V and the electrolyte is selected from among NaCl, NaClO$_3$, HCl, etc.

Figure 2:
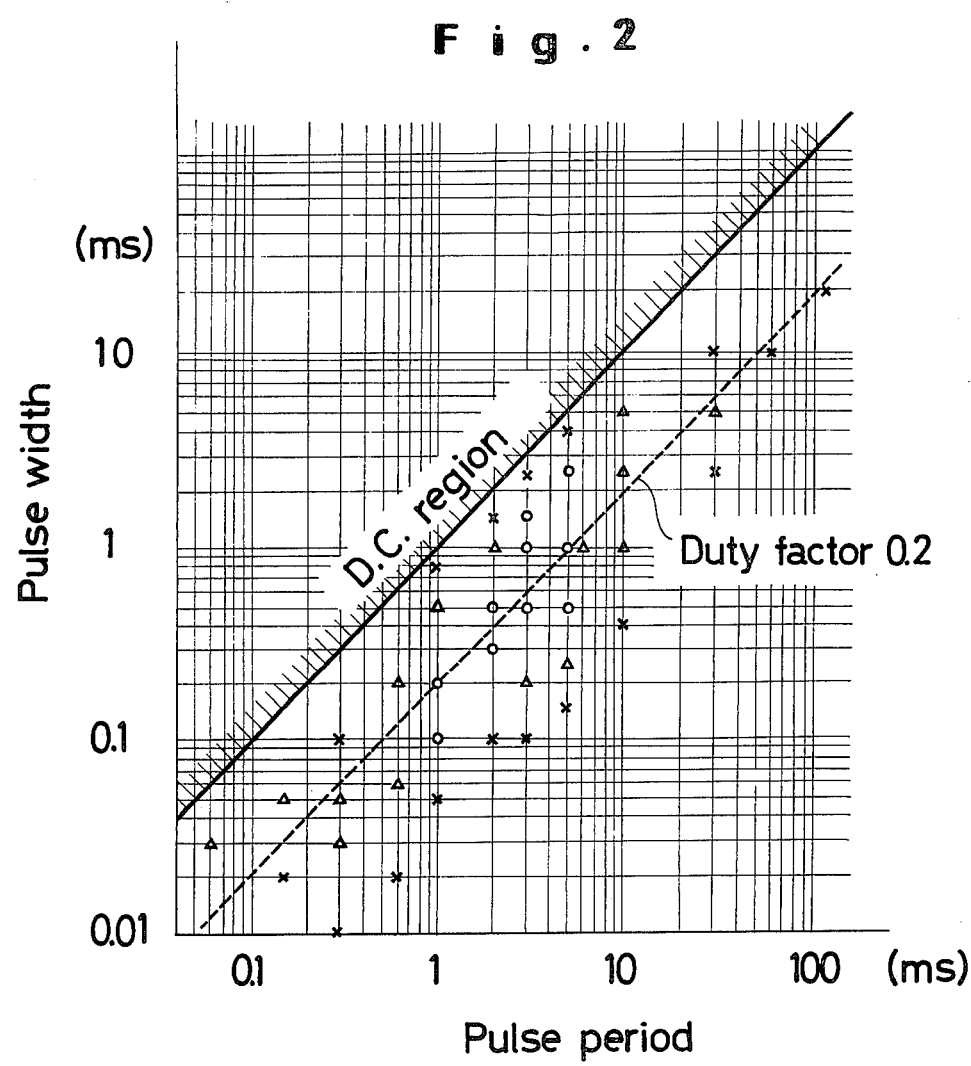
FIG. 2 is a graph indicating the relation between the pulse width, pulse period and feed rate.

FIG. 2 is a graph showing the relation between the pulse width, pulse period and feed rate of the cathode as observed in an operation of electrolysis using NaClO$_3$ as the electrolyte, a work blank made of mild steel, a copper wire 0.8 mm in diameter as the cathode, and a voltage of 15 V applied between the two electrodes to bore holes in the work blank. The plots indicated by the cross ($x$) mark represent the results obtained in operations in which the cathode came into contact with the work blank when the feed rate was fixed at 0.1 mm/min, the plots indicated by the triangle ($\Delta$) mark those obtained in operations in which the cathode came into contact with the work blank when the feed rate was fixed at 0.2 mm/min and the plots indicated by the circle ($\bigcirc$) mark those obtained in operations in which the cathode did not come into contact with the work blank even when the feed rate was fixed at 0.2 mm/min. Thus, the last operations represent cases in which the machining could effectively be accomplished at a feed rate of 0.2 mm/min or higher.

A review of the graph reveals that when there is used a pulsating electric current the pulse period of which is 1.0 ms, the feed rate of the cathode (the machining speed) is more than 0.2 mm/min insofar as the pulse width is in the range of from 0.1 to 0.2 mm (duty factor of 0.1 to 0.2) but that when the pulsating electric current has a pulse width of 0.5 ms (duty factor of 0.5), the machining speed falls below the level of 0.2 mm/min. It is also evident from the graph that effective machining can be obtained by using a pulsating electric current having a pulse width of from 0.5 to 2.5 ms where the pulse period is 5.0 ms. According to this graph, the optimum machining conditions are noted to be around 1 ms of pulse width, around 3 ms of pulse period and around 0.2 of duty factor respectively where the factors involved are taken into consideration relatively.

Figure 3:
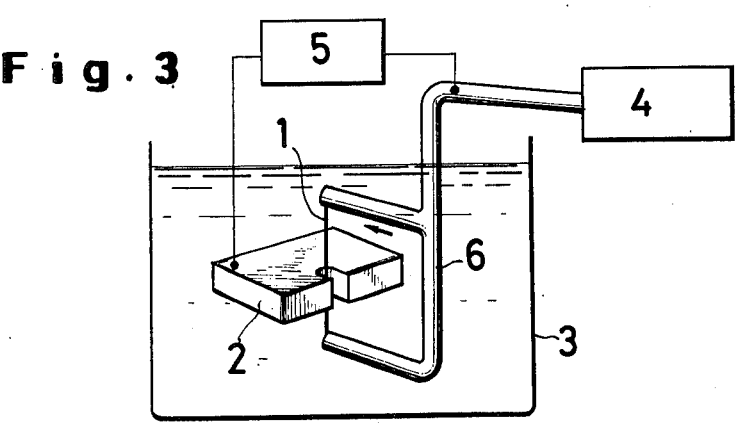
FIG. 3 and FIG. 4 are explanatory diagrams illustrating other preferred embodiments of the method for electrochemical machining according to the present invention.

FIG. 1 illustrates an operation in which small holes are bored through a work blank according to the method of the present invention. FIG. 3 describes another operation in which the method of the present invention is utilized for the purpose of wire cutting.

With reference to FIG. 3, a thin wire 1 (cathode) stretched on a support member 6 is disposed in an electrolyte opposite a work blank 2 across a fixed equilibrium gap. The support member 6 and the work blank 2 are connected respectively to a power source 5 and the support member 6 is maintained in position by a feed device 4.

As a pulsating electric current is supplied from the power source 5, an action of electrochemical dissolution is generated between the wire (cathode) 1 and the work blank 2 to dissolve the portion of the work blank 2 which confronts the electrode. By allowing the wire 1 to be advanced by means of the feed device 4 in proportion to the progress of the work of machining, the front of dissolving is eventually brought to the other side of the work blank to complete the cutting.

Figure 4:
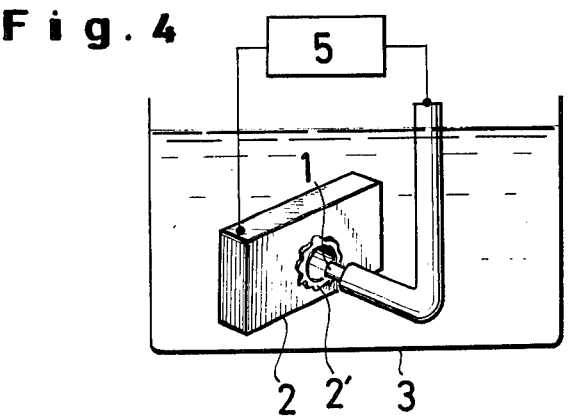

FIG. 4 illustrates a preferred embodiment wherein the method of the present invention is utilized for removing burrs formed on a surface around a perforation obtained by drilling; a round bar (cathode) 1 of a cross section slightly smaller than the circular area surrounded by burrs 2' formed around a perforation drilled through a work blank 2 is disposed opposite said circular area within the burrs 2'. When a pulsating electric current is supplied to flow through the work blank and the cathode, there ensues an action of electrochemical dissolution which removes the burrs. Removal of burrs by the electrochemical machining according to the method of this invention can easily be attained even when burrs occur at such a position that mechanical machining fails to provide effective removal.

As is clear from the foregoing description, the apparatus for effecting the electrochemical machining according to the method of this invention is similar to the ordinary apparatus for electrochemical machining, except that the power source used is of a type for generating a pulsating electric current and a device otherwise required for causing a forced movement of the electrolyte is not used. The portion of the electrolyte which intervenes between the electrode and the work blank is brought into an agitated state by the gases generated intermittently owing to the pulsating electric current, so that the electrochemical machining can effectively be continued without having to cause forced movement of the electrolyte. Since the force otherwise generated by the forced movement of the electrolyte is no longer involved in this operation, the machining can be attained with high accuracy. Particularly where the cathode to be used is in the form of a wire or the work blank to be machined is in the form of a thin plate, the method of the present invention proves advantageous because it obviates the necessity for a forced movement of the electrolyte and therefore provides accurate machining, whereas in the conventional method forced movement of the electrolyte is indispensable and inevitably causes the electrode or work blank to vibrate and, because of this vibration, fails to provide accurate machining.

The present invention will be described more specifically herein below with reference to preferred embodiments. It should be noted that the present invention is not limited to these examples.

EXAMPLE 1

In an electrolytic reservoir, a plate of carbon steel (containing 0.46% of carbon, 0.33% of silica and 0.46% of manganese) 5 mm in thickness as a work blank and a copper wire 2 mm in diameter having insulated lateral sides as a cathode were disposed as illustrated in FIG. 1 in an electrolyte containing NaClO$_3$ at a proportion of 350 g per liter. A pulsating electric current having a pulse width of 0.5 ms, a pulse period of 2 ms, a voltage of 18 V and an average machining amperage of 0.9 A was supplied to flow through the work blank and the copper wire, with th copper wire fed in continuously at a rate of 0.18 mm/min and without causing any forced flow of the electrolyte. In about 27 minutes, a hole 2.8 mm in diameter was bored through the work blank (with a side gap of 0.4 mm).

EXAMPLE 2

In an electrolytic reservoir, a cathode formed by stretching a copper wire 0.2 mm in diameter on a support member and a plate of carbon steel 5 mm in thickness were disposed as illustrated in FIG. 2 in an electrolyte containing NaClO$_3$ at a proportion of 350 g per liter. A pulsating electric current having a pulse width of 0.5 ms, a pulse period of 2 ms, a voltage of 13 V and an average machining amperage of 2.8 A was supplied to flow through said cathode and work blank to effect wire cutting without causing any forced movement of the electrolyte. Consequently, the work could be cut at a cutting speed of 0.38 mm/min with a cut gap of 0.9 mm.

EXAMPLE 3

By following the procedure of Example 2, wire cutting was carried out under the following conditions.
Electrolyte: NaClO$_3$ of a concentration of 350 g/l
Work blank: Tool steel (containing 1.5% of carbon and 10.56% of chromium; not less than H$_{RC}$ 61 in hardness; 20 mm in thickness)
Cathode: Copper wire 0.32 mm in diameter
Pulse width: 0.05 ms
Pulse period: 0.4 ms
Voltage: 13 V
Average machining amperage: 3.4A
Consequently, the work could be cut at a cutting speed of 0.15 mm/min with a cut gap of 0.4 mm.

EXAMPLE 4

By following the procedure of Example 2, wire cutting was carried out under the following conditions.
Electrolyte: NaClO$_3$ of a concentration of 350 g/l
Work blank: Stainless steel (containing 18% of chromium and 8% of nickel; 6 mm in thickness)
Cathode: Copper wire 0.2 mm in diameter
Pulse width: 0.05 ms
Pulse period: 0.2 ms
Voltage: 13V
Average machining amperage: 2.6 A
Consequently, the work could be cut at a cutting speed of 0.28 mm/min with a cut gap of 0.4 mm.

EXAMPLE 5

By following the procedure of Example 2, wire cutting was carried out under the following conditions.
Electrolyte: NaClO$_3$ of a concentration of 350 g/l
Work blank: Carbon steel (same composition as the Example 1; 30 mm in thickness)
Cathode: Copper wire 0.2 mm in diameter
Pulse width: 0.5 ms
Pulse period: 2 ms
Voltage: 13 V
Average machining amperage: 6.5 A
Consequently, the work could be cut at a cutting speed of 0.28 mm/min with a cut gap of 1.0 mm.

EXAMPLE 6

In an electrolyte containing NaNO$_3$ at a proportion of 300 g per liter, a carbon steel plate having a hole 4 mm in diameter bored by drilling and containing burrs around the bored hole was disposed and a copper cable 2 mm in diameter having the insulating sheath removed to a length of 3 mm from the tip was disposed as the cathode opposite said plate as illustrated in FIG. 4. A pulsating electric current having a pulsating width of 0.5 ms, a pulse period of 2 ms, and a voltage of 38 V was supplied to flow through the cathode and the work blank. Consequently, the burrs were removed from the periphery of the hole in about 50 seconds.

EXAMPLE 7

Removal of burrs was carried out by repeating the procedure of Example 6, except that an aluminum plate was used as the work blank. The burrs on the periphery of the hole were removed completely after the supply of a pulsating electric current was continued for about 2 minutes.

What is claimed is:

1. In a method for electrochemical machining wherein desired machining of a work blank is effected by having said work blank and a cathode disposed opposite each other across a gap in an electrolyte and supplying an electric current to flow between said work blank and said cathode at an anode current density of 30 to 300 A/cm$^2$, the improvement which comprises supplying a pulsating electric current having a pulse width of 0.01 ms to 10 ms and a duty factor of not more than 0.5 to flow between the work blank and the cathode while said electrolyte is moved only by gas generated in the electrolyte by the pulsating electric current.

2. The method according to claim 1, wherein the pulse electric current has a period of from 0.05 ms to 50 ms.

3. The method according to claim 1, wherein the cathode is in the form of a wire.

4. The method according to claim 1, wherein the width of the gap is 0.02 to 0.7 mm.

5. The method according to claim 4, wherein the pulsating current is a direct current.

* * * * *